(12) United States Patent
Sandstrom

(10) Patent No.: US 7,250,465 B2
(45) Date of Patent: Jul. 31, 2007

(54) RUBBER COMPOSITION CONTAINING BLOCK COPOLYMER AND TIRE HAVING COMPONENT THEREOF

(75) Inventor: Paul Harry Sandstrom, Cuyahoga Falls, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 344 days.

(21) Appl. No.: 10/921,529

(22) Filed: Aug. 19, 2004

(65) Prior Publication Data

US 2006/0041049 A1  Feb. 23, 2006

(51) Int. Cl.
*C08J 3/22* (2006.01)
(52) U.S. Cl. ...................................... 524/525; 152/450
(58) Field of Classification Search ................ 524/525; 152/450
See application file for complete search history.

(56) References Cited

U.S. PATENT DOCUMENTS 6,255,397 B1 * 7/2001 Sandstrom .................. 525/192

* cited by examiner

*Primary Examiner*—Peter D. Mulcahy
(74) *Attorney, Agent, or Firm*—Henry C. Young, Jr.

(57) ABSTRACT

This invention relates to a rubber composition which contains a block copolymer and a tire having at least one component comprised of such rubber composition. In one aspect of the invention, such rubber composition is comprised of a combination of at least one diene-based elastomer and liquid polymer comprised of a central polyalkylene polymer block, a first terminal hydroxyl group positioned on one end of said polyalkylene polymer block comprised of at least one primary hydroxyl group and a second terminal group positioned on the opposite end of said polyalkylene polymer block comprised of an epoxidized polyisoprene block or a hydrogenated polyisoprene block. The diene-based elastomer may be, for example, cis 1,4-polyisoprene natural rubber and/or other diene-based elastomer. The rubber composition contains reinforcement as carbon black and/or silica together with a coupling agent. The invention further relates to a tire having a tread of such rubber composition.

20 Claims, No Drawings

RUBBER COMPOSITION CONTAINING BLOCK COPOLYMER AND TIRE HAVING COMPONENT THEREOF

FIELD OF THE INVENTION

This invention relates to a rubber composition which contains a block copolymer and a tire having at least one component comprised of such rubber composition. In one aspect of the invention, such rubber composition is comprised of a combination of at least one diene-based elastomer and liquid polymer comprised of a central polyalkylene polymer block, a first terminal hydroxyl group positioned on one end of said polyalkylene polymer block comprised of at least one primary hydroxyl group and a second terminal group positioned on the opposite end of said polyalkylene polymer block comprised of an epoxidized polyisoprene block or a hydrogenated polyisoprene block. The diene-based elastomer may be, for example, cis 1,4-polyisoprene natural rubber and/or other diene-based elastomer. The rubber composition contains reinforcement as carbon black and/or silica together with a coupling agent. The invention further relates to a tire having a tread of such rubber composition.

BACKGROUND OF THE INVENTION

Tires are sometimes prepared with treads of rubber compositions comprised of diene-based elastomers which contain reinforcement as carbon black and/or silica in combination with a coupling agent to aid in coupling the silica and/or hydroxyl terminated liquid ethylene/butylene copolymer to diene-based elastomers.

While rubber processing oils have often been used to improve processability (e.g. to reduce rubber viscosity) of various unvulcanized relatively high viscosity elastomers, as well as to substantially maintain various physical properties for various conjugated diene-based elastomers for various tire components, the inclusion of relatively medium to large rubber processing oil contents in such diene-based rubber compositions often results in an unwanted decrease of various significant rubber physical properties so that such use of significant quantities of rubber processing oils in the respective rubber compositions for various tire components may not be a desirable option.

In one respect, it has heretofore been proposed to use various diene-based liquid polymers which contain olefinic unsaturation to replace at least a portion of rubber processing oil which might otherwise be contained in the respective rubber composition for a tire component. One philosophy has been for the liquid diene-based polymer to initially enhance the processsability of a relatively high viscosity unvulcanized rubber composition (e.g. reduce its viscosity) and to later co-sulfur vulcanize with the diene-based elastomer via the olefinic double bonds contained in the liquid diene-based polymer upon sulfur vulcanizing the rubber composition.

In another aspect, replacement of conventional rubber processing oils with a hydroxyl terminated liquid polyalkylene-based polymer in a sulfur cured tire sidewall rubber composition composed of cis 1,4-polybutadiene, brominated copolymer of isobutylene and para-methylstyrene and a minor amount of cis 1,4-polyisoprene has been suggested in U.S. Pat. No. 6,255,397 as well as U.S. Pat. No. 6,251,992 in which the brominated copolymer of isobutylene and para-methylstyrene is not included.

For this invention, an hydroxyl terminated liquid saturated ethylene/butylene backbone polymer having an hydrogenated polyisoprene block or epoxidized polyisoprene block on the opposite end of the ethylene/butylene copolymer backbone (in addition to its aforesaid hydroxyl terminal group) is used which becomes a part of a sulfur cured network, in combination with the included conjugated diene-based elastomer(s) of the rubber composition for a tire component.

However, it remains desirable to continue to improve various properties and/or processability of various conjugated diene-based rubber compositions for various tire components.

In the description of this invention, the term "phr" as used herein, and according to conventional practice, refers to "parts of a respective material per 100 parts by weight of rubber elastomer". In the description of this invention, the terms "rubber" and "elastomer" can be used interchangeably, unless otherwise distinguished. The terms "rubber composition", "compounded rubber" and "rubber compound" can be used interchangeably to refer to "rubber which has been blended or mixed with various ingredients and materials" and the terms "cure" and "vulcanize" may also be used interchangeably herein, unless otherwise noted and such terms are well known to those having skill in the rubber mixing or rubber compounding art.

The term "butyl-type" polymers or rubbers relates to isobutylene copolymers comprised of isobutylene and a minor amount of conjugated diene (e.g. from about 0.5 to about 3 weight percent conjugated diene such as for example isoprene), which are conventionally referred to as butyl rubbers, as well as halogenated (e.g. brominated or chlorinated) butyl rubber as well as copolymers, particularly brominated copolymers, of isobutylene and para methylstyrene.

SUMMARY AND PRACTICE OF THE INVENTION

In accordance with this invention, a tire is provided having at least one component of a rubber composition comprised of at least one conjugated diene-based elastomer, to the exclusion of butyl-type polymers, based upon parts by weight per 100 parts by weight rubber (phr):

(A) 100 parts by weight (phr) of at least one conjugated diene-based elastomer comprised of:
  (1) about 55 to about 100, alternately from about 60 to about 90, phr of cis 1,4-polyisoprene rubber and
  (2) from zero to 45, alternately from about 10 to about 40, phr of at least one additional conjugated diene-based rubber selected from polymers of 1,3-butadiene, copolymers of isoprene and 1,3-butadiene and copolymers of styrene and at least one of isoprene and 1,3-butadiene;

(B) about 1 to about 30, alternatively about 2 to about 25, or about 2 to about 10, phr of a liquid polyalkylene copolymer selected from:
  (1) a liquid first ethylene/butylene copolymer having at least one terminal primary hydroxyl group on one end of said copolymer and an hydrogenated polyisoprene block which contains olefinic double bonds therein on the opposite end of said copolymer from said terminal hydroxyl group(s), or
  (2) a liquid ethylene/butylene copolymer having at least one terminal primary hydroxyl group on one end of said copolymer and an epoxidized polyisoprene block on the opposite end of said copolymer from said terminal hydroxyl group(s), (C) about 25 to about 100 phr of reinforcing filler as:
  (1) rubber reinforcing carbon black, or
  (2) about 0 to about 95, alternately from about 5 to about 50, phr of rubber reinforcing carbon black and from about 5 to about 100, alternately from about 5 to about 50, phr of synthetic amorphous precipitated silica aggregates, and (D) optionally a coupling agent having a moiety reactive with hydroxyl groups of said ethylene/butylene copolymer and hydroxyl groups (e.g. silanol groups) contained on the surface of the precipitated silica, if said precipitated silica aggregates are used, and another moiety interactive with said conjugated diene-based elastomer(s).

In practice, it is preferred that said reinforcement is comprised of both rubber reinforcing carbon black and precipitated silica aggregates together with a coupling agent. In practice, the weight ratio of said precipitated silica aggregates to said rubber reinforcing carbon black may be, for example, in a range of from about 1/10 to about 10/1.

Significant combined aspects of this invention are considered herein to be, for said rubber composition for a tire component, that:

(A) said rubber composition is exclusive of a butyl-type rubber, (B) a major portion (at least 55 phr) of the rubber component of said rubber composition is cis 1,4-polyisoprene rubber, and (C) said rubber composition contains said hydroxyl terminated ethylene/butylene backboned copolymer with its aforesaid block of hydrogenated polyisoprene or block of epoxidized polyisoprene to promote an optimal balance of cured physical properties particularly relating to abrasion resistance and/or tear resistance.

A further significant aspect of the invention is considered herein to be the use of such cis 1,4-polyisoprene rubber based rubber compositions which contain the aforesaid ethylene/butylene backboned copolymer with its terminal polymeric blocks for various tire components, where the aforesaid tear resistance and/or abrasion resistant properties of the rubber are desired to be optimized while also enhancing the processing of the unvulcanized rubber composition during its prepatory mixing (e.g. blending of ingredients in an internal rubber mixer), calendering (e.g. calendering by open roll processing, a procedure well known to those having skill in the art) as well as extruding the rubber composition (e.g. extrusion through a suitable die to form a shaped rubber article such as, for example, a tire tread strip, a procedure well known to those having skill in such art).

Accordingly, representative of said tire components comprised of said rubber composition include treads (particularly a tread component with a running surface intended to be ground-contacting), plycoat (rubber composition for cord reinforced rubber component for tire carcass plies), wirecoat (rubber composition for wire reinforced rubber component for circumferential tire belts) and chafer (rubber component in a tire bead region for contact with a wheel-rim).

In practice, during the sulfur vulcanization of the rubber composition the liquid hydroxyl terminated, saturated ethylene/butylene backbone copolymers having a hydrogenated polyisoprene or epoxidized polyisoprene block on the opposite end of the copolymer becomes a part of the sulfur cured network of the rubber composition in combination with the aforesaid conjugated diene-based elastomers, particularly the cis 1,4-polyisoprene rubber, of the rubber composition. Therefore, a tire is provided where the rubber composition of the respective tire component is sulfur vulcanized and said hydroxyl terminated ethylene/butylene backbone copolymer containing said partially hydrogenated polyisoprene or epoxidized polyisoprene block is a part of the sulfur vulcanized rubber network of said sidewall rubber composition.

Accordingly, the tire this invention is provided wherein said rubber composition of said tire component is sulfur vulcanized and said hydroxyl terminated ethylene/butylene copolymer containing said hydrogenated polyisoprene block or said epoxidized polyisoprene block is a part of the sulfur vulcanized network of said rubber composition.

And, of course, the use of a liquid copolymer as a processing aid to reduce the rubber viscosity, namely the Mooney (1+4) viscosity, is particularly valuable in order to improve processability of the unvulcanized rubber composition, particularly where relatively high viscosity elastomers are desired, without resorting to utilization of extensive amounts of conventional rubber processing oils.

Thus, an additional significant aspect of the invention is to enable a reduced use of conventional aromatic, naphthenic or paraffinic rubber processing oils in the conjugated diene-based elastomer containing composition for the tire component.

An example of such liquid polyalkylene block polymers which contain the terminal hydroxyl groups and either a hydrogenated polyisoprene block or epoxidized polyisoprene block on the other end are, for example are those available from Shell Chemical as Kraton L-207™ and Kraton L-1302™, respectively.

In practice, the cis 1,4-polyisoprene rubber may be natural rubber or synthetic rubber. Often the natural cis 1,4-polyisoprene rubber may be preferred.

In the practice of this invention, minor amounts (45 or less phr) of various additional conjugated diene-based elastomers, or rubbers, may be used in combination with the primary cis 1,4-polyisoprene rubber constituent (at least about 55 phr), exemplary of which are polymers of 1,3-butadiene, copolymers of isoprene and 1,3-butadiene and copolymers of styrene and at least one of isoprene and 1,3-butadiene which are sulfur curable elastomers and are exclusive of butyl-type polymers.

Representative examples of such additional conjugated diene-based elastomers are, for example, organic solvent polymerization prepared elastomer is comprised of at least one elastomer selected from organic solvent polymerization prepared cis 1,4-butadiene rubber, styrene/butadiene copolymer rubber, isoprene/butadiene copolymer rubber, 3,4-polyisoprene rubber, trans 1,4-polybutadiene polymer, a vinyl polybutadiene rubber having a vinyl 1,2-content in a range of from about 35 to about 90 percent, and styrene/isoprene/butadiene terpolymer rubber; tin coupled elastomers of said organic solvent polymerization prepared elastomers; and aqueous polymerization prepared styrene/butadiene copolymer rubber.

Preferably, such additional elastomers are selected from cis 1,4-polybutadiene, butadiene/styrene copolymers, styrene/isoprene/butadiene terpolymers, isoprene/styrene copolymers and isoprene/butadiene copolymers.

For example, a combination of two or more rubbers may include in combination with the cis-1,4-polyisoprene as a major portion of the elastomers, preferably at least 55 percent by weight, and an additional rubber as, for example, styrene/butadiene rubber (emulsion and/or solution polymerization derived styrene/butadiene rubber, referred to herein as E-SBR and S-SBR), isoprene/butadiene rubber (IBR), styrene/isoprene rubber and styrene/isoprene/butadiene terpolymer (SIBR).

Alternatively, tin coupled organic solvent solution polymerization prepared elastomers of at least one of isoprene and/or 1,3-butadiene may be used. Exemplary of a tin coupled elastomer may be found in U.S. Pat. No. 5,514,756.

In one aspect of this invention, an emulsion polymerization derived styrene-butadiene rubber (E-SBR) and a solution polymerization derived styrene-butadiene rubber (S-SBR) may be used having a relatively conventional styrene content of about 20 percent to about 35 percent bound styrene. In one aspect, however, it may be desired for the E-SBR and/or S-SBR have a relatively high bound styrene content in a range of about 35 percent to about 50 percent and, for an S-SBR, a vinyl content for its butadiene portions being in a range of about 20 to about 60 percent.

Such a relatively high styrene content of about 35 percent to about 50 percent for the E-SBR and S-SBR, together with the aforesaid intermediate vinyl content, can be considered beneficial for a purpose of enhancing traction, or skid resistance, of the tire tread.

In one aspect, the presence of the E-SBR, if used, is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art.

The solution polymerization prepared SBR (S-SBR), IBR and SIBR can be conveniently prepared, for example, by organo-lithium catalyzation in the presence of an organic hydrocarbon solvent.

The cis-1,4-polybutadiene rubber (BR), if used, is considered to be beneficial for a purpose of promoting the tire tread's resistance to wear or treadwear. Such BR can be prepared, for example, by organic solution polymerization of 1,3-butadiene. The BR may conveniently be characterized, for example, by having at least a 90 percent cis-1,4 content.

In practice the rubber compositions of this invention can be prepared by simply mixing the liquid, hydroxyl terminated ethylene/butylene copolymer together with the elastomer(s), particulate reinforcement and coupling agent. This can be done utilizing a wide variety of mixing techniques. In most cases, the mixing will be carried out utilizing a Banbury mixer or a mill mixer. It will generally be preferred to mix the liquid copolymer into the elastomer during the non-productive compounding stage.

However, in the alternative, the liquid hydroxyl terminated ethylene/butylene copolymer can be mixed with the elastomer composition prior to mixing with the remainder of the ingredients except, for example, an antidegradant or, for example, rubber processing oil in a case of an oil extended rubber.

As is conventional practice, well known to those skilled in such art, the rubber compositions mixed in preparatory non-productive mixing stages (non-productive compounds) do not conventionally contain a curative, such as sulfur, or accelerators for the curative. On the other hand, rubber compositions subsequently mixed in productive mixing stages (productive compounds) contain a curative which will cure (vulcanize) the rubber after it is heated to a curing temperature.

The rubber compositions of this invention will frequently and conventionally contain a variety of additional compounding ingredients and/or additives. Typical amounts of processing aids and rubber compounding ingredients may comprise about 1 to about 50 phr. Such processing aids can include, for example, aromatic, naphthenic, and/or paraffinic processing oils. Stearic acid is typically referred to as a "rubber compounding ingredient". As purchased, it typically contains primarily stearic acid with small amounts of at least one of oleic acid, linolenic acid and/or palmitic acid. The mixture may also contain small amounts (less than about six weight percent) of myristic acid, arachidic acid and/or arachidonic acid. Such material or mixture is conventionally referred to in the rubber compounding art as "stearic acid". Typical amounts of antioxidants comprise about 1 to about 5 phr. Representative antioxidants may be, for example, diphenyl-p-phenylenediamine and others such as, for example, those disclosed in *The Vanderbilt Rubber Handbook* (1978), Pages 344 through 346. Typical amounts of antiozonants comprise about 0.5 to about 3 phr. Typical amounts of fatty acids, if used which can include stearic acid, comprise about 0.5 to about 3 phr. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur-vulcanizing agent. Examples of suitable sulfur-vulcanizing agents include elemental sulfur (free sulfur) or sulfur-donating vulcanizing agents, for example, an amine disulfide, polymeric polysulfide or sulfur olefin adducts. Preferably, the sulfur-vulcanizing agent is elemental sulfur. As known to those skilled in the art, sulfur-vulcanizing agents are used in an amount ranging from about 0.5 to about 4 phr, or even in some circumstances, up to about 8 phr, with a range of from about 1.5 to about 2.5, sometimes from 2 to 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2.8, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Some representative examples of primary accelerators which can be utilized include thiazole accelerators, such as benzothiazyldisulfide and 2-mercaptobenzothiazole; sulfenamide accelerators, such as N-oxydiethylene benzothiazole-2-sulfenamide, N-t-butyl-2-benzothiazolesulfenamide and N-cyclohexyl-2-benzothiazolesulfenamide; dithiocarbamate accelerators, such as bismuth dimethyldithiocarbamate, cadmium diethyldithiocarbamate, copper dimethyldithiocarbamate, lead dimethyldithiocarbamate, selenium diethyldithiocarbamate, tellurium diethyldithiocarbamate and zinc dimethyldithiocarbamate; thiuram accelerators such as dipentamethylene thiuram hexasulfide, tetramethylthiuram monosulfide and tetraethylthiuram monosulfide; and thiourea accelerators, such as trimethyl thiourea and dimethylethyl thiourea. If a second accelerator is used, the secondary accelerator is preferably a guanidine, dithiocarbamate or thiuram compound.

Various rubber reinforcing carbon blacks can be used. Representative examples of various rubber reinforcing carbon blacks may be found, for example, in *The Vanderbilt Rubber Handbook*, 1978, Page 417, and listed according to their ASTM designations. For example, rubber reinforcing carbon blacks for tire tread purposes include, but are not limited to, those with ASTM designations of N110, N121, N220, N234 and N299.

The commonly-employed siliceous pigments used in rubber compounding applications can be used as the silica in this invention, including pyrogenic and precipitated siliceous pigments (silica), although the precipitate silicas are preferred and therefor specified.

The siliceous pigments preferably employed in this invention are precipitated silicas such as, for example, those obtained by the acidification of a soluble silicate, e.g., sodium silicate. Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica particles may be considered for use in this invention such as, only for example herein, and without limitation, silicas commercially available from PPG Industries under the Hi-Sil trademark with designations 210, 243, etc.; silicas available from Rhodia such as, for example Zeosil 1165 MP™ and Degussa with, for example, the designation VN3™.

A coupling agent may be optionally used with the rubber composition for the tire component.

Such coupling agent is used to aid in coupling the precipitated silica, if used, as well as the hydroxyl terminated ethylene/butylene polymer, to the conjugated diene-based elastomer(s) in the rubber composition.

Representative examples of various coupling agents are, for example, and not intended herein to be limitative are, for example, bis (3-trialkoxysilylalkyl) polysulfides having an average of from 2 to 4, alternately an average of from about 2 to about 2.6, or an average of from about 3.4 to about 4, connecting sulfur atoms in its polysulfidic bridge, representative of which is a bis(3-triethoxysilylpropyl) polysulfide, as well as alkoxyorganomercaptosilanes, including blocked alkoxyorganomercaptosilanes.

Such coupling agents, may for example be premixed, or pre-reacted, with the silica particles or added to the rubber mix during the rubber/silica processing, or mixing, stage. If the coupling agent is added to the rubber mixture during a rubber mixing stage separately from the silica it is considered that the coupling agent then combines in situ within the rubber host with the silica.

The aforesaid alkoxyorganomercaptosilanes may be used in a form of a blocked alkoxyorganomercaptosilane in which its mercapto functionality has been blocked by a moiety which is itself labile and in which the blocked mercapto functionality may be deblocked under the rubber vulcanization conditions of elevated temperature to provide the rubber reactive mercapto functionality. Thus an appropriate alkoxyorganomercaptosilane such as, for example, mercaptopropyltriethoxysilane, with its mercapto group blocked by such a moiety (organomercaptotrialkylsilane, or mercaptopropyl triethoxysilane having a blocked mercapto moiety with a moiety which capable of being deblocked at an elevated temperature) may be used for which its mercapto moiety is then deblocked during vulcanization of the associated rubber composition at an elevated temperature such as, for example, a temperature in a range of from about 140° C. to about 160° C. For example, see U.S. Pat. Nos. 6,127,468, 6,204,339, 6,414,061, 6,528,673 and 6,608,125 which are incorporated herein in their entirety.

The invention may be better understood by reference to the following examples in which the parts and percentages are by weight unless otherwise indicated.

EXAMPLE I

Preparation of Cis 1,4-Polyisoprene Rubber Based Compositions

Samples of cis 1,4-polyisoprene rubber based compositions are prepared and are identified herein as Samples 1 through 5, with Sample 1 being a Control Sample.

Control Sample 1 contains synthetic cis 1,4-polyisoprene rubber.

Samples 2 through 5 contain various amounts of liquid hydroxyl terminated ethylene/butylene backboned copolymer having a hydrogenated polyisoprene block or epoxidized polyisoprene block on the opposite end of the copolymer from said terminal hydroxyl groups as Kraton L1302™ referred to herein as block copolymer A and Kraton L207™ referred to herein as block copolymer B.

The compositions were prepared by mixing the ingredients in several sequential mixing steps, or stages, in an internal rubber mixer, namely, a first productive stage (without the sulfur and accelerator curatives) followed by a second non-productive mixing stage in which no additional ingredients were added and then followed by a productive mix stage (in which the sulfur and accelerator curatives are added), and the resulting composition was cured under conditions of elevated pressure and temperature. The respective rubber mixtures were removed (dumped) from their respective internal rubber mixers and allowed to cool to a temperature below 40° C. before adding it to the next sequential mixing step.

For the first and second non-productive mixing stages, the ingredients are mixed in an internal rubber mixer for about 4 and 2 minutes, respectively to a temperature of about 160° C. and 150° C., respectively.

In a subsequent productive mixing stage, the curatives are mixed with the rubber composition in an internal rubber mixer for about 3 minutes to a temperature of about 110° C. following which the rubber composition is removed from the mixer, roll milled, sheeted out and allowed to cool to a temperature below 40° C.

The rubber compositions are illustrated in the following Table 1. The rubber compositions are based upon a cis 1,4-polyisoprene elastomer which contains carbon black reinforcement.

TABLE 1

| | Samples | | | | |
|---|---|---|---|---|---|
| | 1 | 2 | 3 | 4 | 5 |
| First Non-Productive Mixing Step | | | | | |
| Cis 1,4-polyisoprene rubber[1] | 100 | 100 | 100 | 100 | 100 |
| Carbon black[2] | 50 | 50 | 50 | 50 | 50 |
| Zinc oxide | 3 | 3 | 3 | 3 | 3 |
| Fatty acid | 2 | 2 | 2 | 2 | 2 |
| Antioxidant[3] | 2 | 2 | 2 | 2 | 2 |
| Rubber processing oil[4] | 5 | 2.5 | 0 | 2.5 | 0 |
| Block copolymer A[5] | 0 | 2.5 | 5 | 0 | 0 |
| Block copolymer B[6] | 0 | 0 | 0 | 2.5 | 5 |
| Second Non-Productive Mixing Step | | | | | |
| Mixing without addition of additional ingredients | | | | | |
| Productive Mixing Step | | | | | |
| Sulfur | 1.3 | 1.3 | 1.3 | 1.3 | 1.3 |
| Accelerator, sulfenamide type | 1 | 1 | 1 | 1 | 1 |

[1]Synthetic 1,4-polyisoprene natural rubber as NAT2200 ™ from The Goodyear Tire & Rubber Company
[2]N229 rubber reinforcing carbon black, ASTM designation
[3]Of the polymerized 1,2-dihydro-2,2,4-trimethylquinoline type
[4]Naphthenic/paraffinic rubber processing oil as Flexon 641 ™ from the ExxonMobil Company
[5]Obtained as Kraton Liquid L1302 ™ from the Shell Chemical Company
[6]Obtained as Kraton Liquid L207 ™ from the Shell Chemical Company The following Table 2 reports physical data for various physical properties of the cis 1,4-polyisoprene based Samples. For cured rubber samples, the respective samples were cured for about 36 minutes to a temperature of about 150° C.

TABLE 2

|  | Samples | | | | |
| --- | --- | --- | --- | --- | --- |
|  | 1 | 2 | 3 | 4 | 5 |
| Processing oil | 5 | 2.5 | 0 | 2.5 | 0 |
| Block polymer A, Kraton L1302 ™ | 0 | 2.5 | 5 | 0 | 5 |
| Block polymer B, Kraton L207 ™ | 0 | 0 | 0 | 2.5 | 5 |
| Rheometer, 150° C. (MDR)[1] | | | | | |
| Maximum torque (dNm) | 17.6 | 17.6 | 17 | 16.8 | 16.9 |
| Minimum torque (dNm) | 2.9 | 3.1 | 3 | 2.8 | 3 |
| Delta torque (dNm) | 14.7 | 14.5 | 14 | 14 | 13.6 |
| T90, minutes | 13.9 | 13.4 | 13.3 | 13.7 | 13.7 |
| Stress-strain (ATS)[2] | | | | | |
| Tensile strength (MPa) | 24.8 | 25 | 25 | 24.6 | 25.2 |
| Elongation at break (%) | 531 | 524 | 534 | 537 | 553 |
| 300% modulus, ring (MPa) | 11.5 | 11.9 | 11.5 | 11.2 | 11 |
| Rebound (%) | | | | | |
| 23° C. | 47 | 47 | 45 | 46 | 45 |
| 100° C. | 64 | 64 | 61 | 63 | 61 |
| Hardness (Shore A)[3] | | | | | |
| 23° C. | 64 | 64 | 62 | 63 | 63 |
| 100° C. | 58 | 59 | 57 | 58 | 57 |
| Tear Strength, 95° C., MPa[4] | 149 | 138 | 177 | 163 | 197 |
| RPA, 100° C.[5] | | | | | |
| G' at 10% strain (kPa) | 1087 | 1099 | 1098 | 1093 | 1074 |
| Tan delta at 10% strain | 0.159 | 0.161 | 0.158 | 0.16 | 0.166 |
| DIN abrasion (2.5N) relative cc loss[6] | 124 | 116 | 121 | 126 | 134 |
| Green strength, modulus at 120% elongation (MPa)[7] | 0.285 | 0.414 | 0.458 | 0.640 | 0.43 |

[1]Data obtained according to Moving Die Rheometer instrument, model MDR-2000 by Alpha Technologies, used for determining cure characteristics of elastomeric materials, such as for example torque, T90 etc.
[2]Data obtained according to Automated Testing System instrument by the Instron Corporation which incorporates six tests in one system. Such instrument may determine ultimate tensile, ultimate elongation, modulii, etc. Data reported in the Table is generated by running the ring tensile test station which is an Instron 4201 load frame.
[3]Shore A hardness according to ASTM D-1415
[4]Data obtained according to a peel strength adhesion (tear strength) test to determine interfacial adhesion between two samples of a rubber composition. In particular, such interfacial adhesion is determined by pulling one rubber composition away from the other at a right angle to the untorn test specimen with the two ends of the rubber compositions being pulled apart at a 180° angle to each other using an Instron instrument.
[5]Data obtained according to Rubber Process Analyzer as RPA 2000 ™ instrument by Alpha Technologies, formerly the Flexsys Company and formerly the Monsanto Company. References to an RPA-2000 instrument may be found in the following publications: H.A. Palowski, et al, Rubber World, June 1992 and January 1997, as well as Rubber & Plastics News, April 26 and May 10, 1993
[6]DIN abrasion (relative to a control) according to DIN 53516. The DIN abrasion values are measures of volume loss of a sample upon exposure to an applied abrasive wheel under a load of 10 Newtons. Lower values are indicative of greater resistance to abrasion.
[7]Relative comparative green strength values (comparative green strengths of one Sample compared to, or relative to, the other Samples) by stress-strain test evaluations at about 23° C. of the respective unvulcanized Samples.

The rebound values are measures of a sample's capacity to adsorb energy when it is deformed under load and recovers upon removing the applied load.

From Table 2 it is observed that the tear strength of the cis 1,4-polyisoprene rubber based Control Sample 1 is improved by the indicated replacement of the conventional rubber processing oil with 5 phr of block polymer A (Sample 3) or 2.5 phr or 5 phr of block polymer B (Samples 4 and 5, respectively). The improved tear strengths of the respective Samples is considered herein to be important for promoting maintenance of the durability of tire components, namely virtually all tire components, and particularly tire tread components which are often subject to chip-chunk and tearing during the working of the tire during use.

It is also observed that the abrasion resistance of the cis 1,4-polyisoprene rubber based Control Sample 1 is improved by the indicated replacement of the conventional rubber processing oil with 2.5 or 5 phr of block polymer A (Samples 2 and 3) which is considered herein to be important for promoting tread wear resistance for tire treads.

Further, it is observed that the relative green strength of the cis 1,4-polyisoprene rubber based rubber composition of Control Sample 1 is increased (improved) by the indicated replacement of the conventional rubber processing oil with either Block Polymer A or Block Polymer B (Samples 2, 3, 4 and 5) which is considered herein to be a beneficial property of the respective rubber composition in the building (fabrication) together of unvulcanized rubber components of a tire, particularly cord reinforced rubber tire carcass plies including wire reinforced rubber tire components, as is well known to those having skill in the tire building art.

EXAMPLE II

Preparation of Emulsion Styrene/Butadiene Based Rubber Compositions

Samples of styrene/butadiene copolymer rubber (E-SBR), (emulsion polymerization prepared styrene/butadiene copolymer elastomer) based rubber compositions are prepared and are identified herein as Samples 6 through 10, with Sample 6 being a Control Sample.

Samples 7 through 10 contain various amounts of liquid hydroxyl terminated ethylene/butylene backboned copolymers which contained a block of hydrogenated polyisoprene or block of epoxidized polyisoprene on the opposite end of the copolymer from said terminal hydroxyl groups as Kraton L1302™ referred to herein as block copolymer A and Kraton L207™ referred herein to as block copolymer B.

The rubber mixtures were mixed in the manner of Example I.

The rubber compositions are illustrated in the following Table 3. The Samples were based upon the E-SBR elastomer with carbon black as the reinforcing filler.

TABLE 3

|  | Samples ||||| 
| --- | --- | --- | --- | --- | --- |
|  | 6 | 7 | 8 | 9 | 10 |
| First Non-Productive Mixing Step | | | | | |
| E-SBR rubber[1] | 100 | 100 | 100 | 100 | 100 |
| Carbon black[2] | 50 | 50 | 50 | 50 | 50 |
| Zinc oxide | 3 | 3 | 3 | 3 | 3 |
| Fatty acid | 2 | 2 | 2 | 2 | 2 |
| Antioxidant[3] | 2 | 2 | 2 | 2 | 2 |
| Rubber processing oil[4] | 5 | 2.5 | 0 | 2.5 | 0 |
| Block copolymer A[5] | 0 | 2.5 | 5 | 0 | 0 |
| Block copolymer B[6] | 0 | 0 | 0 | 2.5 | 5 |
| Second Non-Productive Mixing Step | | | | | |
| Mixing without addition of additional ingredients | | | | | |
| Productive Mixing Step | | | | | |
| Sulfur | 0.9 | 0.9 | 0.9 | 0.9 | 0.9 |
| Accelerator, sulfenamide type[7] | 1 | 1 | 1 | 1 | 1 |
| Accelerator, guanidine type[8] | 1 | 1 | 1 | 1 | 1 |

[1]Emulsion polymerization prepared styrene/butadiene copolymer rubber as PLF1502 ™ from The Goodyear Tire & Rubber Company having a styrene content of about 23.5 percent.
[2]N229 rubber reinforcing carbon black, ASTM designation
[3]Of the polymerized 1,2-dihydro-2,2,4-trimethylquinoline type
[4]Naphthenic/paraffinic rubber processing oil as Flexon 641 ™ from the ExxonMobil Company
[5]Obtained as Kraton Liquid L1302 ™ from the Shell Chemical Company
[6]Obtained as Kraton Liquid L207 ™ from the Shell Chemical Company
[7]Sulfenamide type sulfur vulcanization accelerator
[8]Guanidine type sulfur vulcanization accelerator The following Table 4 reports physical data for various physical properties of the E-SBR based Samples. For cured rubber samples, the respective samples were cured for about 36 minutes to a temperature of about 150° C.

TABLE 4

|  | Samples ||||| 
| --- | --- | --- | --- | --- | --- |
|  | 6 | 7 | 8 | 9 | 10 |
| Processing oil | 5 | 2.5 | 0 | 2.5 | 0 |
| Block polymer A, Kraton L1302 ™ | 0 | 2.5 | 5 | 0 | 0 |
| Block polymer B, Kraton L207 ™ | 0 | 0 | 0 | 2.5 | 5 |
| Rheometer, 150° C. (MDR)[1] | | | | | |
| Maximum torque (dNm) | 14.2 | 14.1 | 14.3 | 14.1 | 14.1 |
| Minimum torque (dNm) | 2.3 | 2.4 | 2.6 | 2.4 | 2.4 |
| Delta torque (dNm) | 11.9 | 11.7 | 11.7 | 11.7 | 11.7 |
| T90, minutes | 17.3 | 16.6 | 16.4 | 15.5 | 14.6 |
| Stress-strain (ATS)[2] | | | | | |
| Tensile strength (MPa) | 23.8 | 20.8 | 23.1 | 22.9 | 21.4 |
| Elongation at break (%) | 515 | 469 | 523 | 524 | 493 |
| 300% modulus, ring (MPa) | 11.2 | 11.1 | 10.8 | 10.5 | 10.8 |
| Rebound (%) | | | | | |
| 23° C. | 45 | 44 | 44 | 44 | 43 |
| 100° C. | 54 | 54 | 53 | 52 | 53 |
| Hardness (Shore A)[3] | | | | | |
| 23° C. | 69 | 69 | 69 | 68 | 69 |
| 100° C. | 57 | 57 | 57 | 57 | 57 |
| Tear Strength, 95° C., MPa[4] | 152 | 88 | 28 | 179 | 142 |
| RPA, 100° C.[5] | | | | | |
| G' at 10% strain (kPa) | 1108 | 1092 | 1112 | 1075 | 1120 |
| Tan delta at 10% strain | 0.169 | 0.177 | 0.18 | 0.184 | 0.181 |
| DIN abrasion (2.5N) relative cc loss[6] | 78 | 85 | 89 | 94 | 91 |

From Table 4 it is observed that the tear strength of the E-EBR based Control Sample 6 with the indicated replacement of conventional rubber processing oil with Block Copolymer A was not improved (Samples 7 and 8) as compared to the cis 1,4-polyisoprene rubber based Sample 3 of Example I.

From Table 4 it is also observed that the tear strength of the E-SBR based Control Sample 6 with the indicated replacement of conventional rubber processing oil with 2.5 phr of Block Polymer B was somewhat improved (Sample 9), but not improved at the 5 phr level of Block Polymer B (Sample 10).

From Table 4 it is also observed that the abrasion resistance of the E-SBR rubber based Control Sample 6 by the indicated replacement of conventional rubber processing oil with either block copolymer A or block copolymer B was not improved (Samples 7, 8, 9 and 10).

Accordingly, it is considered herein that the replacement of the conventional rubber processing oil by the hydroxyl terminated ethylene/butylene backboned copolymer containing a hydrogenated block (block copolymer A) or an epoxidized polyisoprene block (block copolymer B) was more effective where the elastomer of the rubber composition was primarily comprised of cis 1,4-polyisoprene rubber for a rubber composition intended for use in various tire components where tear resistance and/or abrasion resistance are significant considerations.

EXAMPLE III

Preparation of Cis 1,4-Polyisoprene Rubber Based Samples

Samples of synthetic cis 1,4-polyisoprene rubber based rubber compositions are prepared and are identified herein as Samples 11 through 15, with Sample 11 being a Control Sample.

Samples 12 through 13 contain various amounts of said hydroxyl terminated liquid ethylene/butylene copolymers containing said polyisoprene-blocks on the opposite end of said copolymer from said terminal hydroxyl groups as Kraton L1302™ referred to herein as block copolymer A and Kraton L207™ referred herein to as block copolymer B.

The rubber mixtures were mixed in the manner of Example I.

The rubber compositions are illustrated in the following Table 5. The cis 1,4-polyisoprene rubber based Samples contained both carbon black and silica as reinforcing fillers.

TABLE 5

| | Samples | | | | |
|---|---|---|---|---|---|
| | 11 | 12 | 13 | 14 | 15 |
| First Non-Productive Mixing Step | | | | | |
| Cis 1,4-polyisoprene rubber[1] | 100 | 100 | 100 | 100 | 100 |
| Carbon black[2] | 20 | 20 | 20 | 20 | 20 |
| Silica[3] | 15 | 15 | 15 | 15 | 15 |
| Zinc oxide | 3 | 3 | 3 | 3 | 3 |
| Fatty acid | 2 | 2 | 2 | 2 | 2 |
| Antioxidant[4] | 2 | 2 | 2 | 2 | 2 |
| Rubber processing oil[5] | 5 | 2.5 | 0 | 2.5 | 0 |
| Block copolymer A[6] | 0 | 2.5 | 5 | 0 | 0 |
| Block copolymer B[7] | 0 | 0 | 0 | 2.5 | 5 |
| Coupling agent/carbon black composite[8] | 3 | 3 | 3 | 3 | 3 |
| Second Non-Productive Mixing Step | | | | | |
| Silica | 15 | 15 | 15 | 15 | 15 |
| Coupling agent/carbon black composite[8] | 2 | 2 | 2 | 2 | 2 |
| Productive Mixing Step | | | | | |
| Sulfur | 1.4 | 1.4 | 1.4 | 1.4 | 1.4 |
| Accelerator, sulfenamide type[9] | 1.8 | 1.8 | 1.8 | 1.8 | 1.8 |
| Accelerator, guanidine type[10] | 0.5 | 0.5 | 0.5 | 0.5 | 0.5 |

[1]Synthetic cis 1,4-polyisoprene rubber as NAT2200™ from The Goodyear Tire & Rubber Company
[2]N229 rubber reinforcing carbon black, ASTM designation
[3]Precipitated silica as HiSil 210™ from PPG Industries, Inc.
[4]Of the polymerized 1,2-dihydro-2,2,4-trimethylquinoline type
[5]Naphthenic/paraffinic rubber processing oil as Flexon 641™ from the ExxonMobil Company
[6]Obtained as Kraton Liquid L1302™ from the Shell Chemical Company
[7]Obtained as Kraton Liquid L207™ from the Shell Chemical Company
[8]Composite of silica coupling agent and carbon black as bis(3-triethoxysilylpropyl) polysulfide having an average in a range of from about 3.3 to about 3.6 connecting sulfur atoms in its polysulfidic bridge as a composite thereof with carbon black in 50/50 weight ratio as X505™ from Degussa AG
[9]Sulfenamide type sulfur vulcanization accelerator
[10]Guanidine type sulfur vulcanization accelerator The following Table 6 reports physical data for various physical properties of the cis 1,4-polyisoprene rubber based Samples with the combination of carbon black and silica reinforcing fillers. For cured rubber samples, the respective samples were cured for about 36 minutes to a temperature of about 150° C.

TABLE 6

| | Samples | | | | |
|---|---|---|---|---|---|
| | 11 | 12 | 13 | 14 | 15 |
| Processing oil | 5 | 2.5 | 0 | 2.5 | 0 |
| Block polymer A, Kraton L1302™ | 0 | 2.5 | 5 | 0 | 0 |
| Block polymer B, Kraton L207™ | 0 | 0 | 0 | 2.5 | 5 |
| Rheometer, 150° C. (MDR)[1] | | | | | |
| Maximum torque (dNm) | 19.9 | 20.2 | 20.4 | 20.3 | 20.6 |
| Minimum torque (dNm) | 2.2 | 2.3 | 2.2 | 2.2 | 2.2 |
| Delta torque (dNm) | 17.7 | 17.9 | 18.2 | 18.1 | 18.4 |
| T90, minutes | 15.1 | 14.7 | 15 | 14.9 | 15.3 |
| Stress-strain (ATS)[2] | | | | | |
| Tensile strength (MPa) | 23.4 | 24.5 | 24.9 | 25.4 | 24.9 |
| Elongation at break (%) | 482 | 497 | 505 | 515 | 501 |
| 300% modulus, ring (MPa) | 13 | 13.1 | 13.1 | 13 | 13.3 |

TABLE 6-continued

| | Samples | | | | |
|---|---|---|---|---|---|
| | 11 | 12 | 13 | 14 | 15 |
| Rebound (%) | | | | | |
| 23° C. | 55 | 54 | 55 | 54 | 56 |
| 100° C. | 70 | 67 | 69 | 69 | 69 |
| Hardness (Shore A)[3] | | | | | |
| 23° C. | 69 | 69 | 70 | 68 | 69 |
| 100° C. | 64 | 64 | 64 | 63 | 64 |
| Tear Strength, 95° C., MPa[4] | 53 | 49 | 51 | 47 | 61 |
| RPA, 100° C.[5] | | | | | |
| G' at 10% strain (kPa) | 1415 | 1453 | 1487 | 1499 | 1452 |
| Tan delta at 10% strain | 0.101 | 0.105 | 0.104 | 0.106 | 0.104 |
| DIN abrasion (2.5N) relative cc loss[6] | 119 | 116 | 115 | 118 | 116 |

From Table 6 it is observed that there is a slight improvement in abrasion resistance (lower resultant numbers) with little or no change in tear resistance by the indicated replacement of the conventional rubber processing oil of the Control Sample 11 with either the Block copolymer A or Block copolymer B (Samples 12 through 15).

While certain representative embodiments and details have been shown for the purpose of illustrating the invention, it will be apparent to those skilled in this art that various changes and modifications may be made therein without departing from the spirit or scope of the invention.

What is claimed is:

1. A tire having at least one component of a rubber composition comprised of at least one conjugated diene-based elastomer, to the exclusion of butyl type polymers, based upon parts by weight per 100 parts by weight rubber (phr):
   (A) 100 parts by weight (phr) of at least one conjugated diene-based elastomer comprised of:
      (1) about 55 to about 100 phr of cis 1,4-polyisoprene rubber and
      (2) from zero to 45 phr of at least one additional conjugated diene-based rubber selected from polymers of 1,3-butadiene, copolymers of isoprene and 1,3-butadiene and copolymers of styrene and at least one of isoprene and 1,3-butadiene;
   (B) about 1 to about 30 phr of a liquid polyalkylene copolymer selected from:
      (1) a first ethylene/butylene copolymer having at least one terminal primary hydroxyl group on one end of said copolymer and a partially hydrogenated polyisoprene block which contains olefinic double bonds therein on the opposite end of said copolymer from said terminal hydroxyl group, or
      (2) a second ethylene/butylene copolymer having at least one terminal primary hydroxyl group on one end of said copolymer and an epoxidized polyisoprene block on the opposite end of said copolymer from said terminal hydroxyl group,
   (C) about 25 to about 100 phr of reinforcing filler as:
      (1) rubber reinforcing carbon black, or
      (2) about 0 to about 95 phr of rubber reinforcing carbon black and from about 5 to about 100 phr of synthetic amorphous precipitated silica aggregates, and
   (D) optionally a coupling agent having a moiety reactive with hydroxyl groups of said ethylene/butylene copolymer and hydroxyl groups contained on the surface of said precipitated silica, if said precipitated silica aggregates are used, and another moiety interactive with said conjugated diene-based elastomer(s);
   wherein said butyl-type rubbers are:
   (E) copolymers of isobutylene and conjugated diene,
   (B) halogenated copolymers of isobutylene and conjugated diene, and
   (C) brominated copolymers of isobutylene and para methylstyrene.

2. The tire of claim 1 wherein said rubber composition of said tire component is sulfur vulcanized and said hydroxyl terminated ethylene/butylene copolymer containing said partially hydrogenated polyisoprene block or said epoxidized polyisoprene block is a part of the sulfur vulcanized network of said rubber composition.

3. The tire of claim 1 wherein said liquid polyalkylene copolymer is said first liquid ethylene/butylene copolymer having at least one terminal primary hydroxyl group on one end of said copolymer and a partially hydrogenated polyisoprene block which contains olefinic double bonds therein on the opposite end of said copolymer from said terminal hydroxyl group.

4. The tire of claim 1 wherein said liquid polyalkylene copolymer is said second liquid ethylene/butylene copolymer having at least one terminal primary hydroxyl group on one end of said copolymer and an epoxidized polyisoprene block on the opposite end of said copolymer from said terminal hydroxyl group.

5. The tire of claim 1 wherein said reinforcing filler is carbon black and said rubber composition is exclusive of said coupling agent.

6. The tire of claim 1 wherein said reinforcing filler is carbon black and said rubber composition contains said coupling agent.

7. The tire of claim 1 where said reinforcing filler for said rubber composition of said tire component is comprised of
   (A) about 5 to about 50 phr of rubber reinforcing carbon black, and
   (B) about 5 to about 50 phr of synthetic amorphous precipitated silica aggregates.

8. The tire of claim 7 wherein said reinforcing filler is exclusive of said coupling agent.

9. The tire of claim 1 wherein said rubber composition for said tire component contains a coupling agent having a moiety reactive with hydroxyl groups of said ethylene/butylene copolymer and hydroxyl groups contained on the surface of said precipitated silica and another moiety interactive with said conjugated diene-based elastomer(s).

10. The tire of claim 9 wherein said coupling agent is comprised of at least one of a bis(3-alkoxysilylalkyl) polysulfide having an average of from 2 to 4 connecting sulfur atoms in its polysulfidic bridge, alkoxyorganomercaptosilane and blocked alkoxyorganomercaptosilane having its mercapto functionality blocked by a moiety which is itself labile and in which the blocked mercapto functionality may be deblocked under the rubber vulcanization conditions of elevated temperature to provide the rubber reactive mercapto functionality.

11. The tire of claim 1 wherein said rubber composition of said tire component is comprised of, based upon parts by weight per 100 parts by weight rubber (phr):
(A) 100 parts by weight (phr) of at least one conjugated diene-based elastomer comprised of:
  (1) about 60 to about 90 phr of cis 1,4-polyisoprene rubber and
  (2) from about 10 to about 40 phr of at least one additional conjugated diene-based rubber selected from polymers of 1,3-butadiene, copolymers of isoprene and 1,3-butadiene and copolymers of styrene and at least one of isoprene and 1,3-butadiene;
(B) about 2 to about 25 phr of said liquid polyalkylene copolymer selected from:
  (1) a first liquid ehylene/butylene copolymer having at least one terminal primary hydroxyl group on one end of said copolymer and a partially hydrogenated polyisoprene block which contains olefinic double bonds therein on the opposite end of said copolymer from said terminal hydroxyl group, or
  (2) a second liquid ethylene/butylene copolymer having at least one terminal primary hydroxyl group on one end of said copolymer and an epoxidized polyisoprene block on the opposite end of said copolymer from said terminal hydroxyl group,
(C) about 25 to about 100 phr of reinforcing filler as:
  (1) rubber reinforcing carbon black, or
  (2) about 0 to about 95 phr of rubber reinforcing carbon black and from about 5 to about 100 phr of synthetic amorphous precipitated silica aggregates, and
(D) optionally a coupling agent having a moiety reactive with hydroxyl groups of said ethylene/butylene copolymer and hydroxyl groups contained on the surface of the precipitated silica, if said precipitated silica aggregates are used, and another moiety interactive with said conjugated diene-based elastomer(s).

12. The tire of claim 11 wherein said rubber composition of said tire component is sulfur vulcanized and said hydroxyl terminated ethylene/butylene copolymer containing said partially hydrogenated polyisoprene block or an epoxidized polyisoprene block is a part of the sulfur vulcanized network of said rubber composition.

13. The tire of claim 11 wherein said liquid polyalkylene copolymer is said first liquid ethylene/butylene copolymer having at least one terminal primary hydroxyl group on one end of said copolymer and a partially hydrogenated polyisoprene block which contains olefinic double bonds therein on the opposite end of said copolymer from said terminal hydroxyl group.

14. The tire of claim 11 wherein said liquid polyalkylene copolymer is said second liquid ethylene/butylene copolymer having at least one terminal primary hydroxyl group on one end of said copolymer and an epoxidized polyisoprene block on the opposite end of said copolymer from said terminal hydroxyl group.

15. The tire of claim 11 wherein said reinforcing filler is carbon black and said rubber composition is exclusive of said coupling agent.

16. The tire of claim 11 where said reinforcing filler for said rubber composition of said tire component is comprised of
(A) about 5 to about 50 phr of rubber reinforcing carbon black, and
(B) about 5 to about 50 phr of synthetic amorphous precipitated silica aggregates.

17. The tire of claim 16 wherein said tire component contains a coupling agent having a moiety reactive with hydroxyl groups of said ethylene/butylene copolymer and hydroxyl groups contained on the surface of said precipitated silica and another moiety interactive with said conjugated diene-based elastomer(s).

18. The tire of claim 11 wherein said coupling agent is comprised of at least one of a bis(3-alkoxysilylalkyl) polysulfide having an average of from 2 to 4 connecting sulfur atoms in its polysulfidic bridge, alkoxyorganomercaptosilane and blocked alkoxyorganomercaptosilane having its mercapto functionality is blocked by a moiety which is itself labile and in which the blocked mercapto functionality may be deblocked under the rubber vulcanization conditions of elevated temperature to provide the rubber reactive mercapto functionality.

19. The tire of claim 11 wherein said additional conjugated diene-based elastomer is comprised of at least one elastomer selected from;
(A) organic solvent polymerization prepared cis 1,4-butadiene rubber, styrene/butadiene copolymer rubber, isoprene/butadiene copolymer rubber, 3,4-polyisoprene rubber, trans 1,4-polybutadiene polymer, a vinyl polybutadiene rubber having a vinyl content in a range of from about 35 to about 90 percent, and styrene/isoprene/butadiene terpolymer rubber;
(B) tin coupled elastomers of said organic solvent polymerization prepared elastomers; and
(C) aqueous polymerization prepared styrene/butadiene copolymer rubber.

20. The tire of claim 1 wherein said tire component is selected from at least one of a tire tread, plycoat, wirecoat and chafer.

* * * * *